United States Patent
Oroskar et al.

(10) Patent No.: US 9,736,729 B1
(45) Date of Patent: Aug. 15, 2017

(54) DIRECTING A UE TO FORGO REQUESTING HANDOVER TO CONGESTED NEIGHBOR

(71) Applicant: Sprint Spectrum L.P., Overland Park, KS (US)

(72) Inventors: Siddharth S. Oroskar, Overland Park, KS (US); Jasinder P. Singh, Olathe, KS (US); Nagi A. Mansour, Arlington, VA (US); Azza Hassan, Dunn Loring, VA (US); Diego Estrella Chavez, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 118 days.

(21) Appl. No.: 14/699,232

(22) Filed: Apr. 29, 2015

(51) Int. Cl.
| | |
|---|---|
| *H04W 28/02* | (2009.01) |
| *H04W 28/10* | (2009.01) |
| *H04W 36/00* | (2009.01) |
| *H04W 36/22* | (2009.01) |
| *H04W 72/12* | (2009.01) |
| *H04W 16/08* | (2009.01) |

(52) U.S. Cl.
CPC ........ *H04W 28/10* (2013.01); *H04W 28/0284* (2013.01); *H04W 28/0289* (2013.01); *H04W 36/0083* (2013.01); *H04W 36/22* (2013.01); *H04W 16/08* (2013.01); *H04W 72/12* (2013.01)

(58) Field of Classification Search
CPC ............. H04W 28/10; H04W 36/0083; H04W 28/0284; H04W 76/04–76/066; H04W 36/16–36/24; H04W 28/02; H04W 28/0289; H04W 36/08
USPC .......................... 370/229, 331; 455/436–444
See application file for complete search history.

(56) References Cited

U.S. PATENT DOCUMENTS

| | | | |
|---|---|---|---|
| 8,289,925 B2 | 10/2012 | Ore | |
| 2007/0037581 A1* | 2/2007 | Morita | H04W 28/02 455/453 |
| 2007/0177510 A1* | 8/2007 | Natarajan | H04W 36/22 370/238 |
| 2008/0248795 A1* | 10/2008 | Petersen | H04W 24/08 455/423 |
| 2009/0280813 A1* | 11/2009 | Bavois | H04W 76/027 455/436 |

(Continued)

FOREIGN PATENT DOCUMENTS

| | | |
|---|---|---|
| WO | 00/65863 A1 | 11/2000 |
| WO | 01/47288 A2 | 6/2001 |

*Primary Examiner* — Steven H Nguyen
*Assistant Examiner* — Ivan O Latorre

(57) ABSTRACT

Disclosed are methods and systems for requesting a UE to forgo handover to a congested neighbor. In particular, a wireless communication system may serve the UE over an air interface connection between the UE and the first base station. While serving the UE, the wireless communication system may receive from the UE a handover request requesting a handover of the UE from the first base station to a second base station. In response to receiving from the UE the handover request, the wireless communication system may determine that the second base station is threshold congested, and, responsive to the determining, (i) deny the handover request and (ii) send to the UE a command for the UE to withhold transmission of further requests for handover of the UE from the first base station to the second base station.

13 Claims, 4 Drawing Sheets

(56) References Cited

U.S. PATENT DOCUMENTS

| | | | | |
|---|---|---|---|---|
| 2011/0261786 A1* | 10/2011 | Bontu | .................... | H04W 48/02 370/331 |
| 2012/0028645 A1* | 2/2012 | Kim | ...................... | H04W 48/06 455/444 |
| 2012/0165065 A1* | 6/2012 | Sawada | ............. | H04W 36/0072 455/525 |
| 2013/0095879 A1* | 4/2013 | Gupta | .................. | H04W 76/027 455/525 |
| 2013/0115959 A1* | 5/2013 | Amirijoo | .......... | H04W 36/0083 455/440 |
| 2013/0163464 A1* | 6/2013 | Lau | ......................... | H04L 43/16 370/253 |
| 2014/0112306 A1 | 4/2014 | Zhou | | |
| 2014/0113631 A1 | 4/2014 | Zhou | | |
| 2014/0213277 A1* | 7/2014 | Jang | ...................... | H04W 28/08 455/453 |
| 2014/0248882 A1* | 9/2014 | Wang | .................... | H04W 24/04 455/436 |
| 2014/0269269 A1* | 9/2014 | Kovvali | ................ | H04W 24/08 370/229 |
| 2015/0111575 A1* | 4/2015 | Lei | ........................ | H04W 36/08 455/436 |
| 2015/0249947 A1* | 9/2015 | Zhang | ................... | H04W 28/24 370/332 |
| 2015/0271727 A1* | 9/2015 | Harrang | ................ | H04W 36/22 370/229 |
| 2016/0065419 A1* | 3/2016 | Szilagyi | .............. | H04L 41/5067 709/224 |
| 2016/0112896 A1* | 4/2016 | Karampatsis | ..... | H04W 28/0252 370/230.1 |
| 2016/0198370 A1* | 7/2016 | Watanabe | ......... | H04W 36/0061 455/436 |
| 2016/0285679 A1* | 9/2016 | Dudda | .................. | H04W 24/02 |
| 2016/0295461 A1* | 10/2016 | Chiu | ................. | H04W 36/0083 |

* cited by examiner

DIRECTING A UE TO FORGO REQUESTING HANDOVER TO CONGESTED NEIGHBOR

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), and Global System for Mobile Communications (GSM), among others. Each protocol may define its own procedures for registration of UEs, initiation of communications, handover between coverage areas, and other functions related to air interface communication.

In accordance with the air interface protocol, each coverage area may define a number of channels or specific resources for carrying signals and information between the base station and UEs. For instance, certain resources on the downlink may be reserved to carry a reference signal that UEs may detect as an indication of coverage and may measure to evaluate coverage quality, other resources on the downlink may be reserved to carry other control signaling to UEs, and still other resources on the downlink may be reserved to carry bearer traffic and other such communications to UEs. Likewise, certain resources on the uplink may be reserved to carry various control signaling from UEs to the base station, and other resources on the uplink may be reserved to carry bearer traffic and other such communications from UEs.

When a UE is served by a base station, the base station and/or associated network infrastructure may maintain a "neighbor list" that indicates other nearby base stations to which UEs being served by the base station could potentially hand over. Such a neighbor list could specify various information about each such handover neighbor, including for instance one or more coverage frequencies on which the neighbor operates, a network address of the neighbor, and a geographic location of the neighbor. In practice, such neighbor data could be updated from time to time as changes are made in the configuration of the network, such as when base stations are added, removed, moved, or reconfigured. For instance, the neighbor data could be updated manually by engineering input as changes are made to the network and/or through an automated process as UEs report various detected neighbors.

Further, when the UE is served by the base station, the UE may regularly monitor the reference signal from that base station and reference signals from other base stations in the vicinity, to help ensure that the UE continues to operate in a most appropriate coverage area. If the UE finds that one or more other base stations provide sufficiently strong coverage, perhaps sufficiently stronger than the UE's currently serving base station, then the UE may initiate handover. For instance, the UE may transmit to its serving base station a measurement report that specifies the one or more detected coverage areas and, for each such coverage area, the detected signal strength. The serving base station (source base station) and/or associated network infrastructure may then decide based on the UE's measurement report to process a handover of the UE to a particular base station (target base station) from which the UE detected sufficiently strong signal strength.

Overview

A wireless communication system may serve a UE over an air interface connection between the UE and a first base station. While serving the UE, the wireless communication system may receive from the UE a handover request specifying a request for handover of the UE from the first base station to a second base station. Once the wireless communication system receives the handover request, the wireless communication system could deny this handover request if the wireless communication system determines that the second base station is threshold congested.

In some cases, after denying this initial handover request, the wireless communication system may again receive from the UE a subsequent handover request specifying the request for handover of the UE from the first base station to the second base station. In such cases, the wireless communication system could again determine that the second base station is threshold congested and may then again deny the handover request based on this determination. In this manner, as long as the second base station is threshold congested, the wireless communication system may repeatedly receive handover requests from the UE and may then repeatedly deny each such handover request. Overall, this may result in unnecessary consumption of network resources, among other undesirable outcomes.

Disclosed herein is an arrangement to help overcome problems resulting from such repeated requests for handover. In accordance with the disclosure, the wireless communication system may receive from the UE a handover request requesting handover of the UE from the first base station to the second base station and may responsively determine that the second base station is threshold congested. Once the wireless communication system determines that the second base station is threshold congested, the wireless communication system may deny the handover request and may transmit to the UE a directive indicating that the UE should withhold transmission of further requests for handover of the UE from the first base station to the second base station. In this manner, the wireless communication system may avoid a situation where the wireless communication system repeatedly receives requests for handover of the UE from the first base station to the second base station.

In another aspect of the disclosure, the wireless communication system could determine that the second base station is threshold congested without the wireless communication system first receiving from the UE the handover request requesting handover of the UE from the first base station to the second base station. In this case, responsive to determining that the second base station is threshold congested (e.g., based on one or more instances of congestion-based handover denial), the wireless communication system may transmit to the UE a directive indicating that the UE should withhold transmission of requests for handover of the UE from the first base station to the second base station. In this manner, the wireless communication system can help ensure that it does not receive from the UE handover requests that the wireless communication system would otherwise deny.

In either case, the wireless communication system may determine at a later point in time that the second base station is no longer threshold congested. Responsive to determining that the second base station is no longer threshold congested, the wireless communication system may then transmit to the UE a further directive indicating that the UE should no longer withhold transmission of further requests for handover of the UE from the first base station to the second base station. As such, upon receiving this further directive, the UE may again be set to transmit such handover requests, when appropriate, to the wireless communication system.

Accordingly, disclosed herein is a method operable in a wireless communication system including a first base station and a second base station. In accordance with the method, the wireless communication system serves a UE over an air interface connection between the UE and the first base station. While serving the UE, the wireless communication system receives from the UE a handover request requesting a handover of the UE from the first base station to the second base station. In response to receiving from the UE the handover request, the wireless communication system determines that the second base station is threshold congested, and, responsive to the determining, (i) denies the handover request and (ii) sends to the UE a command for the UE to withhold transmission of further requests for handover of the UE from the first base station to the second base station.

Additionally, disclosed herein is another method operable in a wireless communication system including a first base station and a second base station. In accordance with this method, the wireless communication system serves a UE over an air interface connection between the UE and the first base station. While serving the UE, the wireless communication system determines that the second base station is threshold congested. In response to determining that the second base station is threshold congested, the wireless communication system sends to the UE a command for the UE to withhold transmission of requests for handover of the UE from the first base station to the second base station.

Further, disclosed herein is a wireless communication system including a first base station, a second base station, and a controller configured to perform operations. The operations may involve causing the first base station to serve a UE over an air interface connection between the UE and the first base station. The operations may also involve, while the first base station serves the UE, receiving from the UE a handover request requesting a handover of the UE from the first base station to the second base station. The operations may further involve, in response to receiving from the UE the handover request, determining that the second base station is threshold congested, and, responsive to the determining, (i) denying the handover request and (ii) sending to the UE a command for the UE to withhold transmission of further requests for handover of the UE from the first base station to the second base station.

Yet further, in another respect, disclosed is a non-transitory computer-readable medium having stored thereon instructions executable by a processor to cause a wireless communication system to carry out functions such as those noted above, to facilitate transmission of a directive for the UE to forgo requesting handover to a congested neighbor.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described herein as being performed by one or more entities may be implemented in various ways, such as by a processor executing software instructions for instance.

Figure 1:
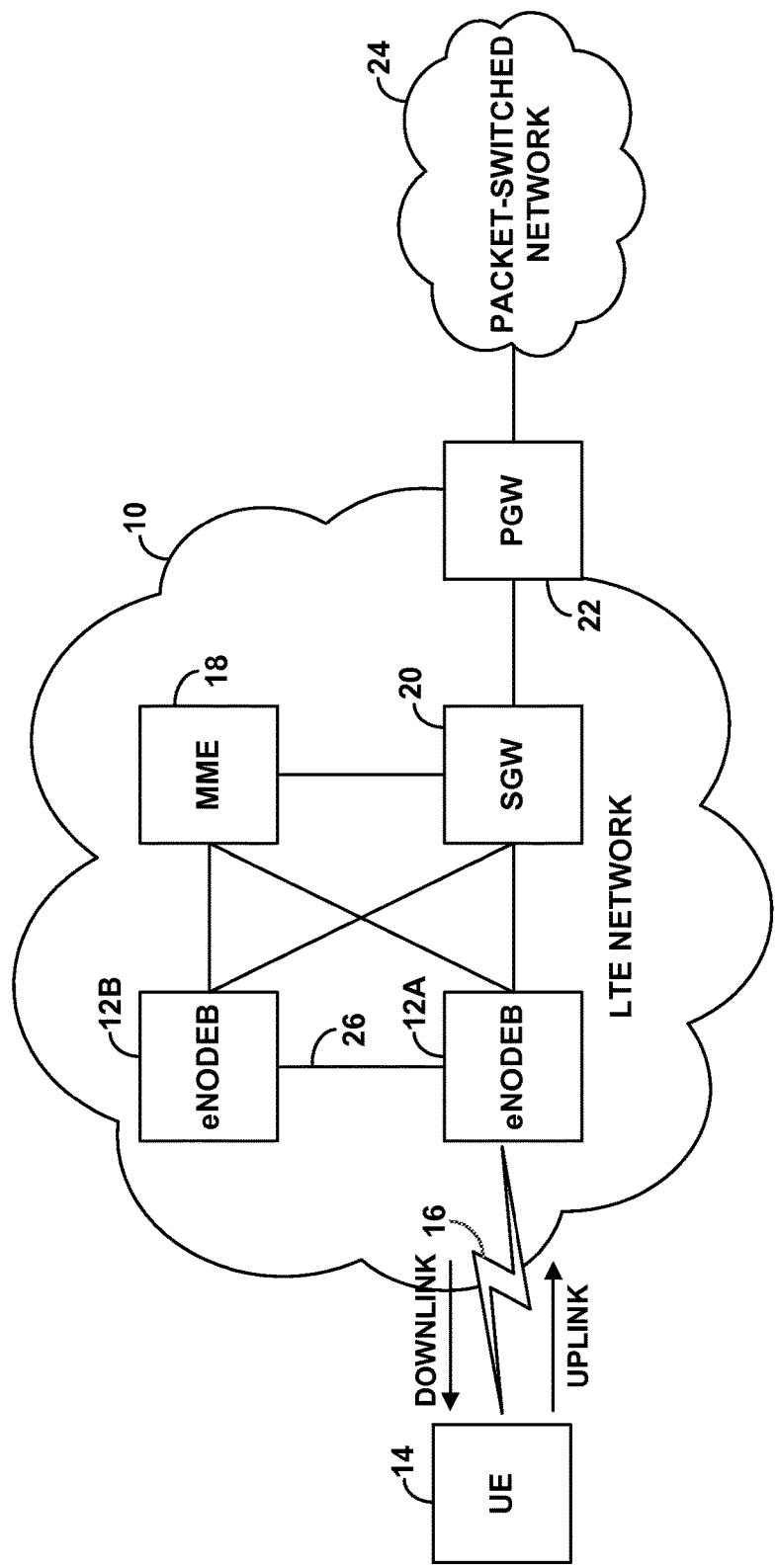
FIG. 1 is a simplified block diagram of a wireless communication system in which the present method can be implemented.

Referring to the drawings, as noted above, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes example LTE macro base stations 12A-12B known as eNodeBs. Each such eNodeB has an antenna structure and associated equipment for providing an LTE coverage area in which to serve UEs such as an example UE 14. For instance, eNodeB 12A radiates to provide a coverage area defining a wireless air interface 16 through which the eNodeB 12A may communicate with one or more served UEs, such as UE 14, via the downlink and the uplink.

As shown in FIG. 1, eNodeBs 12A-12B each have a communication interface with a Mobility Management Entity (MME) 18. The MME 18 can function as a signaling controller for the LTE network 10. Further, eNodeBs 12A-12B each have a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeBs 12A-12B are each communicatively linked with a core network, which is operated by a wireless service provider. The core network then provides connectivity with one or more MMEs, such as MME 18, as well as one or more gateways such as SGW 20 and PGW 22.

In practice, eNodeB 12A and eNodeB 12B may also engage in signaling communication with each other. In particular, eNodeB 12A and eNodeB 12B may communicate with each other over an inter-eNodeB "X2" interface 26, which may pass through the core network or over a more direct physical connection between the eNodeB 12A and the eNodeB 12B. Other example arrangements may also be possible.

Figure 2:
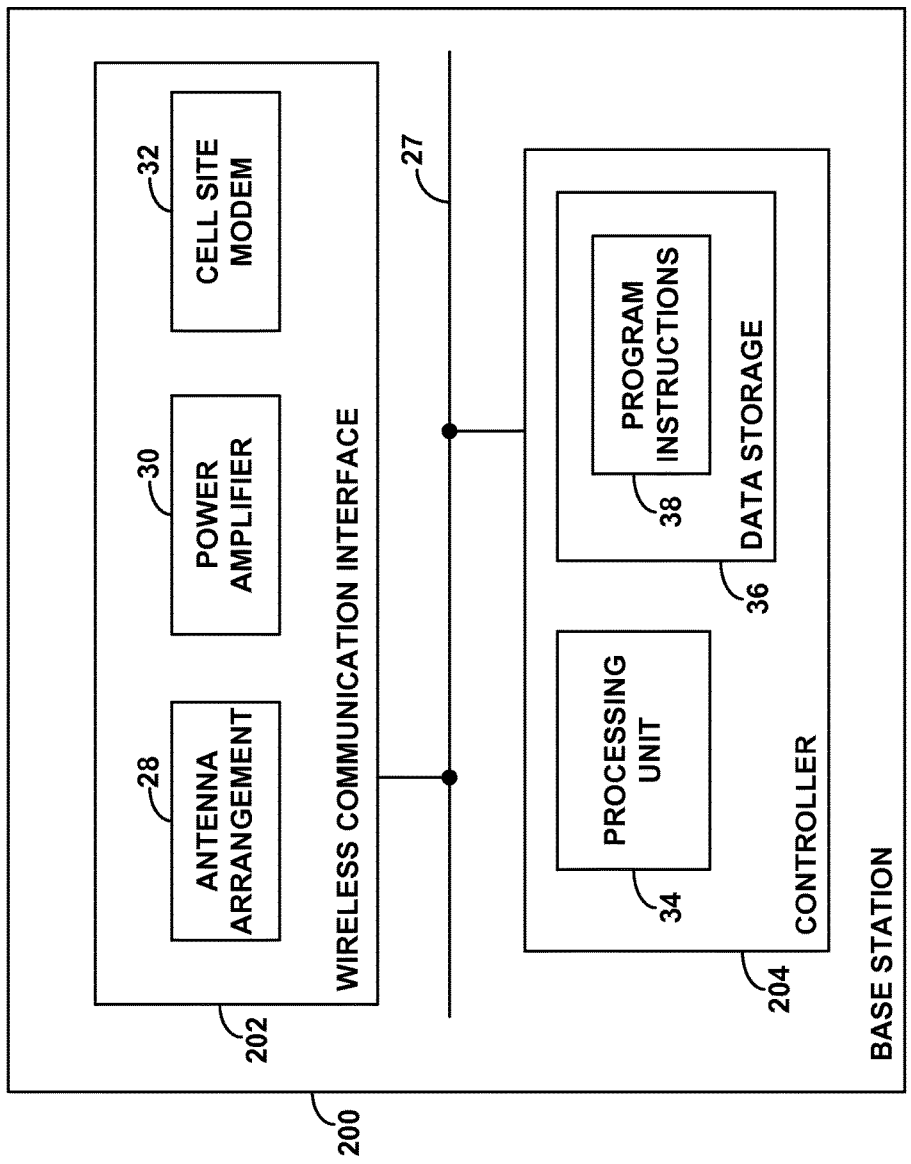
FIG. 2 is a simplified block diagram of a base station in which the present method can be implemented.

FIG. 2 is next a simplified block diagram of a representative base station 200 such as eNodeB 12A or eNodeB 12B, illustrating some of the components that can be included in such an entity. As shown in FIG. 2, the representative base station 200 may include a wireless communication interface 202 and a controller 204. Additionally, these components of the base station 200 may be communicatively linked together by a system bus, network, or other connection mechanism 27. Alternatively, they may be integrated together in various ways.

As shown, wireless communication interface 202 may include an antenna arrangement 28, which may be tower mounted, and associated components such as a power amplifier 30 and a cell site modem 32 for engaging in air interface communication with UEs via the antenna arrangement 28, so as to transmit data and control information to the UEs and receive data and control information from the UEs. Additionally, controller 204 may include processing unit 34 and data storage 36 and is arranged to manage or carry out various functions such as those discussed herein.

Processing unit 34 may then comprise one or more general purpose processors (e.g., microprocessors) and/or special-purpose processors (e.g., digital signal processors and/or application specific integrated circuits) and may be integrated in whole or in part with the wireless communication interface 202. And data storage 36 may include one or more volatile and/or non-volatile storage components, such as magnetic, optical, flash, or other types of non-transitory computer readable media, and may be integrated in whole or in part with processing unit 34.

As shown, data storage 36 may hold (e.g., have encoded thereon) program instructions 38, which may be executable by processing unit 34 to carry out various controller functions. As such, the processing unit 34 programmed with instructions 38 may define part or all of a controller for controlling operation of the base station 200. Alternatively or additionally, however, such control functionality could be provided external to the base station 200, in another entity (e.g., separate from the base station 200) such as by a base station control entity (e.g., MME 18), which may be communicatively linked with the base station and may serve to control certain aspects of base station operation generally.

Moreover, base station 200 in a wireless communication system can take various forms. For instance, the base station 200 could be a macro base station operated by a wireless carrier to provide a broad range of coverage and may thus include a tall antenna tower and a power amplifier for providing high transmission power. Alternatively, the base station 200 could be a small cell base station ("small cell"), such as a femtocell, typically having a much smaller form factor and operating at lower transmission power for providing a smaller range of coverage. Other forms are also possible.

Figure 3:
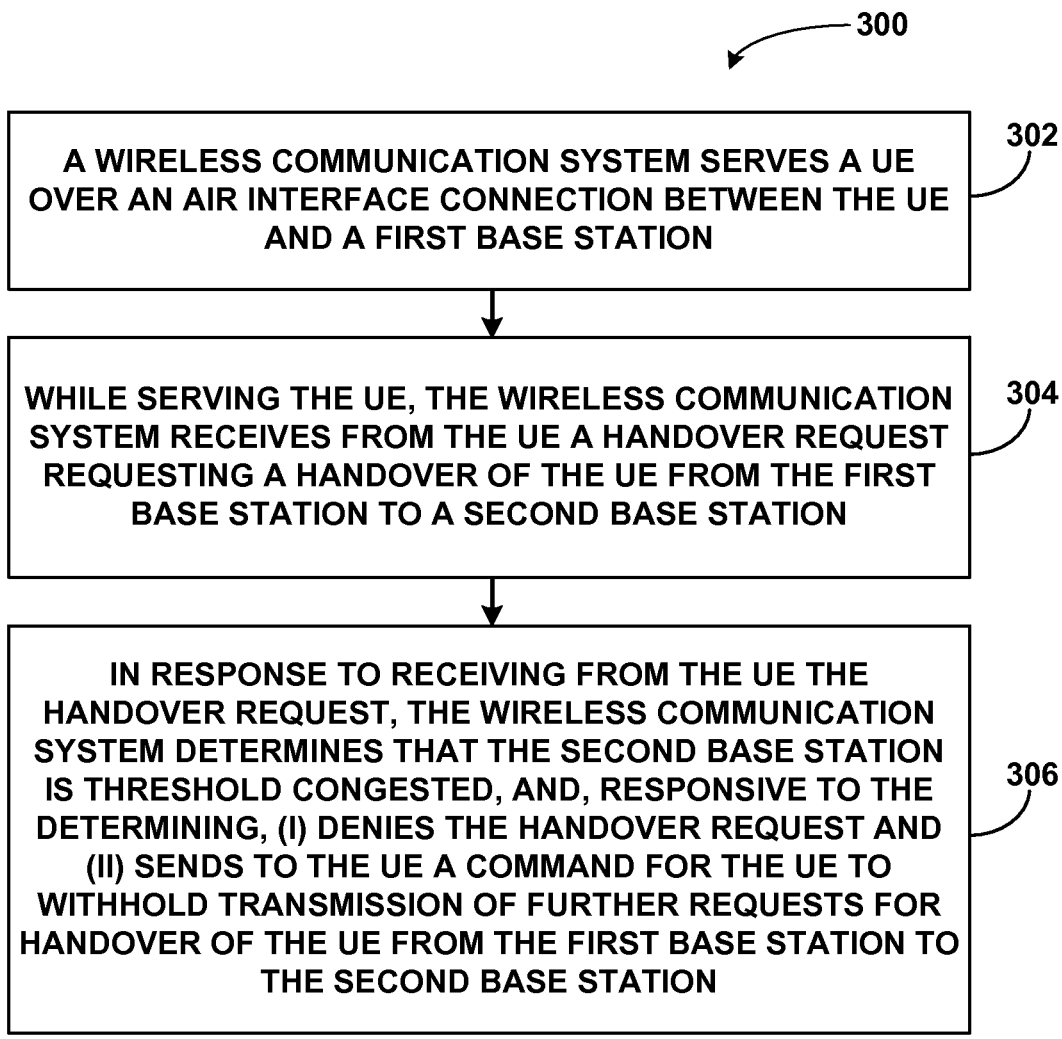
FIG. 3 is a flowchart illustrating a method for directing a UE to forgo requesting handover to a congested neighbor, in accordance with an example embodiment.

FIG. 3 is a flowchart illustrating a method 300, according to an example embodiment. Illustrative methods, such as method 300, may be carried out in whole or in part by component(s) and/or arrangement(s) in a wireless communication system, such as by the one or more of the components of the representative LTE network 10 shown in FIG. 1 and/or with one or more of the components of the base station 200 shown in FIG. 2. However, it should be understood that example methods, such as method 300, may be carried out by other entities or combinations of entities as well as in other arrangements, without departing from the scope of the disclosure.

In particular, method 300 may be operable in a wireless communication system including a first base station (e.g., eNodeB 12A) and a second base station (e.g., eNodeB 12B). As shown by block 302 in FIG. 3, method 300 involves the wireless communication system serving a UE (e.g., UE 14) over an air interface connection between the UE and the first base station. At block 304, method 300 then involves, while serving the UE, the wireless communication system receiving from the UE a handover request requesting a handover of the UE from the first base station to the second base station. At block 306, method 300 then involves, in response to receiving from the UE the handover request, the wireless communication system determining that the second base station is threshold congested, and, responsive to the determining, (i) denying the handover request and (ii) sending to the UE a command for the UE to withhold transmission of further requests for handover of the UE from the first base station to the second base station.

As noted above, the present disclosure provides for a process that is used to direct a UE to forgo requesting handover to a congested neighbor. This process could be carried out by eNodeB 12A itself and/or by one or more other network entities, such as with portions of the analysis carried out by an entity outside of the eNodeB 12A (e.g., MME 18) and the eNodeB 12A then responsively working to direct the UE 14 to forgo requesting handover to a congested neighbor. For simplicity, however, the process will be described here in a scenario where the eNodeB 12A carries out all aspects of the process.

Referring again to FIG. 1, we may assume by way of example (and without limitation) that UE 14 is attached with eNodeB 12A and is thus being served with wireless communication service by eNodeB 12A. As such, we may assume that the UE 14 has worked with eNodeB 12A to establish a Radio Resource Control (RRC) connection defining a radio-link-layer connection between the UE 14 and the eNodeB 12A, and that at least one logical bearer has been established between the UE 14 and the PGW 22, with the bearer including a radio portion extending between the UE 14 and the eNodeB 12A and an access portion extending between the eNodeB 12A and the PGW 22 via the SGW 20. Further, we may assume that, as the UE 14 is served by eNodeB 12A, the UE 14 regularly monitors a downlink reference signal from eNodeB 12A and from each other eNodeB that the UE can detect, such as eNodeB 12B for instance.

If the UE 14 thereby detects that the reference signal strength of another coverage area is sufficiently stronger than the reference signal strength of the UE's current serving coverage area, then the UE 14 may engage in a handover process. When the UE 14 is operating in an idle mode, this handover process may involve the UE 14 simply transitioning from operating in the idle mode in one coverage area to operating in the idle mode in the other coverage area, and possibly signaling to notify the network of the UE's new coverage area. When the UE 14 is operating in an active/ connected mode, this handover process may also involve signaling between the UE 14 and the network to facilitate transferring the UE's connection from one coverage area to another. In practice, this handover process may thus occur between coverage areas of a given base station or between coverage areas of different base stations (and thus between base stations), such as between eNodeB 12A and eNodeB 12B.

More specifically, when the UE 14 detects sufficiently strong coverage from eNodeB 12B, such as coverage sufficiently stronger than that of serving eNodeB 12A, the UE 14 may transmit a measurement report to eNodeB 12A to trigger possible handover. Under LTE, if the source eNodeB 12A determines that the reported signal strength of the target eNodeB 12B is sufficiently stronger, then the source eNodeB 12A may responsively transmit a handover request via the X2 interface 26 to the target eNodeB 12B in order to prepare the target eNodeB 12B to receive handover of the UE 14. Alternatively, the UE 14 may determine that the reported signal strength of the target eNodeB 12B is sufficiently stronger and may then responsively transmit to the eNodeB 12A a handover request requesting handover of the UE 14 from eNodeB 12A to eNodeB 12B. Other handover processing techniques are also possible.

In line with the discussion above, once the eNodeB 12A receives the handover request, the eNodeB 12A could deny this handover request if the eNodeB 12A determines that eNodeB 12B is threshold congested. In practice, network congestion may occur when a communication link carries a sufficiently large extent of data, thereby resulting in delays in transmission of the data and/or in a packet loss defining a failure by one or more data packets to reach their intended destination, among other undesirable outcomes. In an example implementation, threshold congestion may occur when a value defining congestion of the eNodeB 12B exceeds a value defining the threshold congestion. Accordingly, such congestion (and evaluation of threshold congestion) could take on various forms.

In one case, this congestion may involve backhaul congestion defining, for instance, congestion for data transmitted between the packet-switched network 24 and eNodeB 12B. By way of example, the system may experience a delay (e.g., 3 seconds) in transmission of data between the packet-switched network 24 and eNodeB 12B, and the eNodeB 12A may then determine that this delay exceeds a threshold delay (e.g., 2 seconds). For instance, SGW 20 may transmit to the eNodeB 12B a data packet and may then wait to receive from the eNodeB 12B an acknowledgement indicating successful transmission of the data packet from SGW 20 to eNodeB 12B. Once the SGW 20 receives this acknowledgement, the SGW 20 may determine that there has been a delay in receiving this acknowledgement (e.g., by comparing expected time of reception to an actual time of reception). As such, threshold congestion at the eNodeB 12B may involve this delay exceeding the threshold delay.

In another case, the congestion may involve congestion of air interface communications at the eNodeB 12B. In accordance with LTE, for example, the air interface may be divided over time into a continuum of 10 millisecond frames, with each frame being further divided into ten 1 millisecond subframes or transmission time intervals (TTIs) that are in turn divided into two 0.5 millisecond segments. In each 0.5 millisecond time segment, the air interface may then be considered to define a number of 12-subcarrier wide "resource blocks" spanning the frequency bandwidth (i.e., as many as would fit in the given frequency bandwidth). In addition, each resource block may be divided over time into symbol segments of 67 μs each, with each symbol segment spanning the 12-subcarriers of the resource block and thus each supporting transmission of 12 orthogonal frequency division multiplex (OFDM) symbols in respective "resource elements."

With this arrangement, during a particular subframe, the system may determine the extent to which the resources are being used by the eNodeB 12B. For instance, the system may determine the extent by defining a percentage of used air interface resources. The system can determine such a percentage by calculating a number of used resource elements relative to a total number of resource elements available for use by the eNodeB 12B. By way of example, during a subframe, an air interface channel may span a total of 100 resource elements. During this subframe, the channel may include 90 used resource elements, thereby amounting to a percentage of used air interface resources in the channel of 90%. As such, threshold congestion at the eNodeB 12B may involve this percentage exceeding a threshold percentage (e.g., 80%). Other cases and examples are also possible.

In accordance with the disclosure, the eNodeB 12A could determine that eNodeB 12B is threshold congested before the eNodeB 12A receives from the UE 14 the handover request. In this case, the eNodeB 12A could maintain a record of this determination (e.g., in data storage) and could refer to that record once the eNodeB 12A receives the handover request, so as to determine the threshold congestion based on the earlier determination of threshold congestion. In some implementations, the eNodeB 12A could maintain this record for some time period (e.g., a predetermined time period). After this time period, the eNodeB 12A may then remove the record such that the eNodeB 12A would no longer deny the handover request. In another case, the eNodeB 12A may receive from the UE 14 the handover request and may then responsively take steps determine the threshold congestion (e.g., without referring to a record of an earlier determination of threshold congestion). In either case, the eNodeB 12A could determine that eNodeB 12B is threshold congested in one of various ways.

In one example, the eNodeB 12B may transmit to the eNodeB 12A congestion reports (e.g., via the X2 interface 26) such that the eNodeB 12A can determine a congestion state of the eNodeB 12B (and could perhaps maintain a record in data storage specifying the congestion state of the eNodeB 12B). Each such congestion report may specify an extent of congestion of the eNodeB 12B. For instance, a congestion report may specify an extent (e.g., a percentage) of network resource (e.g., air interface resources) being used by the eNodeB 12B from among the total network resources available to eNodeB 12B. When the eNodeB 12A receives one or more such congestion reports, the eNodeB 12A may determine whether the extent of congestion specified in such reports exceeds a threshold extent of congestion. If the eNodeB 12A determines that the extent of congestion exceeds the threshold extent of congestion, the eNodeB 12A may thus determine that eNodeB 12B is threshold congested.

In another example, determining that the eNodeB 12B is threshold congested may involve determining that threshold congestion of eNodeB 12B caused handover of the UE 14 from eNodeB 12B to eNodeB 12A such that the wireless communication system then serves the UE 14 over the air interface connection 16 between the UE 14 and eNodeB 12A. In particular, eNodeB 12B may serve UE 14 and may then engage in handover processing to hand over the UE 14 to eNodeB 12A. As part of (or subsequent to) the handover processing, eNodeB 12B could transmit to eNodeB 12A (e.g., via the X2 interface 26) a cause code specifying a cause for handover of the UE 14 from eNodeB 12B to eNodeB 12A. If this cause code specifies the cause as being threshold congestion of eNodeB 12B, the eNodeB 12A may then determine that the eNodeB 12B is threshold congested.

In yet another example, the system (e.g., MME 18) could receive from the eNodeB 12B one or more cause codes each indicating a cause of a respective handover from the eNodeB 12B to another eNodeB. For instance, the eNodeB 12B may receive such cause codes as part of (or subsequent to) one or more respective handovers of one or more UEs. Moreover, the respective handover could be a handover of any UE (e.g., not necessarily UE 14) served by eNodeB 12B. Also, the respective handover could be a handover of a UE to any eNodeB that provides sufficient coverage for the UE (e.g., not necessarily to eNodeB 12A).

In this example, the system may determine a count of particular cause codes (e.g., from among the one or more received caused codes) that indicate the cause as being congestion of the eNodeB 12B. The system may then determine whether or not this count (e.g., 5 cause codes) exceeds a threshold count (e.g., 4 cause codes). If this count exceeds the threshold count, the system may determine that eNodeB 12B is threshold congested and could report this determination to eNodeB 12A. In this manner, the system could use the cause codes to determine that there has been a threshold extent of congestion-based handovers from the eNodeB 12B to other eNodeBs.

In yet another example, the eNodeB 12A may determine that threshold congestion of the eNodeB 12B resulted in a failed attempt to hand over the UE 14 from eNodeB 12A to eNodeB 12B. In particular, as noted above, in some cases the eNodeB 12A may receive from the UE 14 the handover request and may then responsively determine the threshold congestion such as without referring to a record indicating an earlier determination of threshold congestion. For instance, the eNodeB 12A may receive from the UE 14 the handover request requesting handover of the UE 14 from eNodeB 12A to eNodeB 12B. In response to the request, the eNodeB 12A may attempt to process the handover but may receive from the eNodeB 12B a denial of the handover. This denial could include a cause code indicating a cause for denial of the handover. If the indicated cause is threshold congestion of the eNodeB 12B, the eNodeB 12A may thus determine in this way that the eNodeB 12B is threshold congestion. Other examples of determining the threshold congestion are also possible.

In accordance with the disclosure, as noted above, once the eNodeB 12A receives the handover request, the eNodeB 12A could determine that the eNodeB 12B is threshold congested and, responsive to determining that the eNodeB 12B is threshold congested, could deny this handover request. Additionally, responsive to determining that the eNodeB 12B is threshold congested, the eNodeB 12A may also send to the UE 14 a command for the UE 14 to withhold transmission of further requests for handover of the UE 14 from the eNodeB 12A to the eNodeB 12B.

In particular, eNodeB 12A may be configured to attempt to process handover requests received from UEs, such as from UE 14. However, when eNodeB 12A determines that eNodeB 12B is threshold congested, the eNodeB 12A may reconfigure itself to deny requests for handover of a UE from eNodeB 12A to eNodeB 12B. Such reconfiguration of eNodeB 12A could take on various forms. In one case, when eNodeB 12A determines that eNodeB 12B is threshold congested, the eNodeB 12A may add eNodeB 12B to an avoidance list (which can also be referred to as a no-handover list) defining a list of base stations to which the eNodeB 12A should not handover UEs. The eNodeB 12A could maintain such a list in data storage and could thus refer to this list when receiving a handover request. With this arrangement, the eNodeB 12A could receive from the UE 14 the handover request and could then refer to the avoidance list in order to determine whether or not eNodeB 12B is part of the list. If eNodeB 12A determines that eNodeB 12B is part of the list, the eNodeB 12A may responsively deny the handover request.

In another case, eNodeB 12A may update its context record for the UE 14 (and perhaps for one or more other UEs served by eNodeB 12A) to indicate that the eNodeB 12A should deny requests for handover of the UE 14 from eNodeB 12A to eNodeB 12B. For example, the eNodeB 12A may do so in the above-mentioned situation at which the eNodeB 12A determines that threshold congestion of eNodeB 12B caused handover of the UE 14 from eNodeB 12B to eNodeB 12A such that the wireless communication system then serves the UE 14 over the air interface connection 16 between the UE 14 and eNodeB 12A. As such, when eNodeB 12A determines in this manner that eNodeB 12B is threshold congested, eNodeB 12A may update its context record for the UE 14 (and perhaps for one or more other UEs served by eNodeB 12A) to indicate that the eNodeB 12A should deny requests for handover of the UE 14 from eNodeB 12A to eNodeB 12B. Other cases are also possible.

Regardless of the case, responsive to determining that the eNodeB 12B is threshold congested, the eNodeB 12A could take steps to deny the handover request. For instance, the eNodeB 12 may transmit to the UE 14 a message noting the denial of the handover request. Once the UE 14 receives this message, the UE 14 can determine that the handover request has been denied. Other instances are also possible.

In an example implementation, the eNodeB 12A may transmit to the UE 14 the above-mentioned command by engaging in RRC connection messaging with the UE 14. In particular, the eNodeB 12A may transmit to the UE 14 an RRC connection reconfiguration message directing the UE 14 to withhold transmission of further requests for handover of the UE 14 from the eNodeB 12A to the eNodeB 12B. This message could also specify an identifier of the eNodeB 12B (e.g., a Physical Cell Identity (PCI) and/or pseudo-noise offset (PN offset)), so as to inform the UE 14 of the particular eNodeB to which the UE 14 should not request a handover.

Once the UE 14 receives this message, the UE 14 may reconfigure itself to withhold transmission of such further handover requests. To do so, the UE 14 may update its context record to indicate that the UE 14 has been directed to withhold transmission of further requests for handover of the UE 14 from the eNodeB 12A to the eNodeB 12B, so that the UE 14 will be prepared to engage in communication with the eNodeB 12A without again transmitting to the eNodeB 12A such a handover request. With this arrangement, the eNodeB 12A could also update its context record for the UE 14 to indicate that the UE 14 has been directed to withhold transmission of further requests for handover of the UE 14 from the eNodeB 12A to the eNodeB 12B, so that the eNodeB 12A could later direct the UE 14 to no longer withhold the further handover requests in the event that the eNodeB 12A determines that the eNodeB 12B is no longer threshold congested.

In some situations, the UE 14 could be arranged to undo the restriction set by the command, so as to no longer withhold transmission of the further handover requests. For instance, the UE 14 may (i) continuously (or from time-to-time) determine a state of the UE 14 in order to detect a particular transition from operation of the UE 14 in a first state to operation of the UE 14 in a second state, and responsive to detecting this particular transition, (ii) no longer withhold transmission of further requests for handover of the UE 14 from the eNodeB 12A to the eNodeB 12B. The UE 14 could be configured to do so in response to engineering input. Alternatively, the received command may direct the UE 14 to do so. In either case, this particular transition could take on various forms.

In one example, if the UE 14 detects a transition of the UE 14 from operating in an active mode to operating in an idle mode, the UE 14 may no longer withhold transmission of further requests for handover of the UE 14 from the eNodeB 12A to the eNodeB 12B. In another example, if the UE 14 detects handover of the UE 14 from eNodeB 12A to a different base station (e.g., to any base station other than eNodeB 12B), the UE 14 may no longer withhold transmission of requests for handover of the UE 14 to the eNodeB 12B. Other examples are also possible.

In other situations, the eNodeB 12A may reconfigure itself to no longer deny requests for handover of the UE 14 from eNodeB 12A to eNodeB 12B. For instance, the eNodeB 12A may (i) continuously (or from time-to-time) determine a state of the UE 14 in order to detect a particular transition from operation of the UE 14 in a first state to operation of the UE 14 in a second state, and responsive to detecting this particular transition, (ii) reconfigure itself to no longer deny requests for handover of the UE 14 from eNodeB 12A to eNodeB 12B. To do so, the eNodeB 12A may update its context record for the UE 14 so as to indicate that the eNodeB 12A should no longer deny requests for handover of the UE 14 from eNodeB 12A to eNodeB 12B. Additionally, the eNodeB 12A could detect the this particular transition and may responsively transmit to the UE 14 a further command for the UE 14 to no longer withhold transmission of further requests for handover of the UE 14 from eNodeB 12A to eNodeB 12B. Other situations are also possible.

In an example implementation, the eNodeB 12A may transmit to the UE 14 this further command by engaging in further RRC connection messaging with the UE 14. In particular, the eNodeB 12A may transmit to the UE 14 another RRC connection reconfiguration message directing the UE 14 to no longer withhold transmission of further requests for handover of the UE 14 from the eNodeB 12A to the eNodeB 12B. Once the UE 14 receives this message, the UE 14 may reconfigure itself to no longer withhold transmission of such further handover requests. To do so, the UE 14 may update its context record to indicate that the UE 14 has been directed to no longer withhold transmission of further requests for handover of the UE 14 from the eNodeB 12A to the eNodeB 12B, so that the UE 14 will be prepared to transmit to the eNodeB 12A such a handover request when appropriate. With this arrangement, the eNodeB 12A could also update its context record for the UE 14 to indicate that the UE 14 has been directed to no longer withhold transmission of further requests for handover of the UE 14 from the eNodeB 12A to the eNodeB 12B, so that the eNodeB 12A will then be ready to process such handover requests when appropriate.

In a further aspect of the disclosure, eNodeB 12A may determine that eNodeB 12B is threshold congested (e.g., responsive to the handover request) and may then responsively begin to continuously (or from time-to-time) determine congestion state of the eNodeB 12B. By way of example, eNodeB 12A may do so by periodically referring to the record specifying the congestion state of the eNodeB 12B, among other possibilities. By periodically determining congestion state of the eNodeB 12B, the eNodeB 12A may thereafter determine that eNodeB 12B is no longer threshold congested, such as by determining that the congestion state no longer corresponds to the threshold congestion. In response to determining that eNodeB 12B is no longer threshold congested, the eNodeB 12A may transmit to the UE 14 the further command for the UE 14 to no longer withhold transmission of further requests for handover of the UE 14 from eNodeB 12A to eNodeB 12B. Further, the eNodeB 12A may also responsively reconfigure itself to no longer deny requests for handover of the UEs from eNodeB 12A to eNodeB 12B. Other aspects are also possible.

Figure 4:
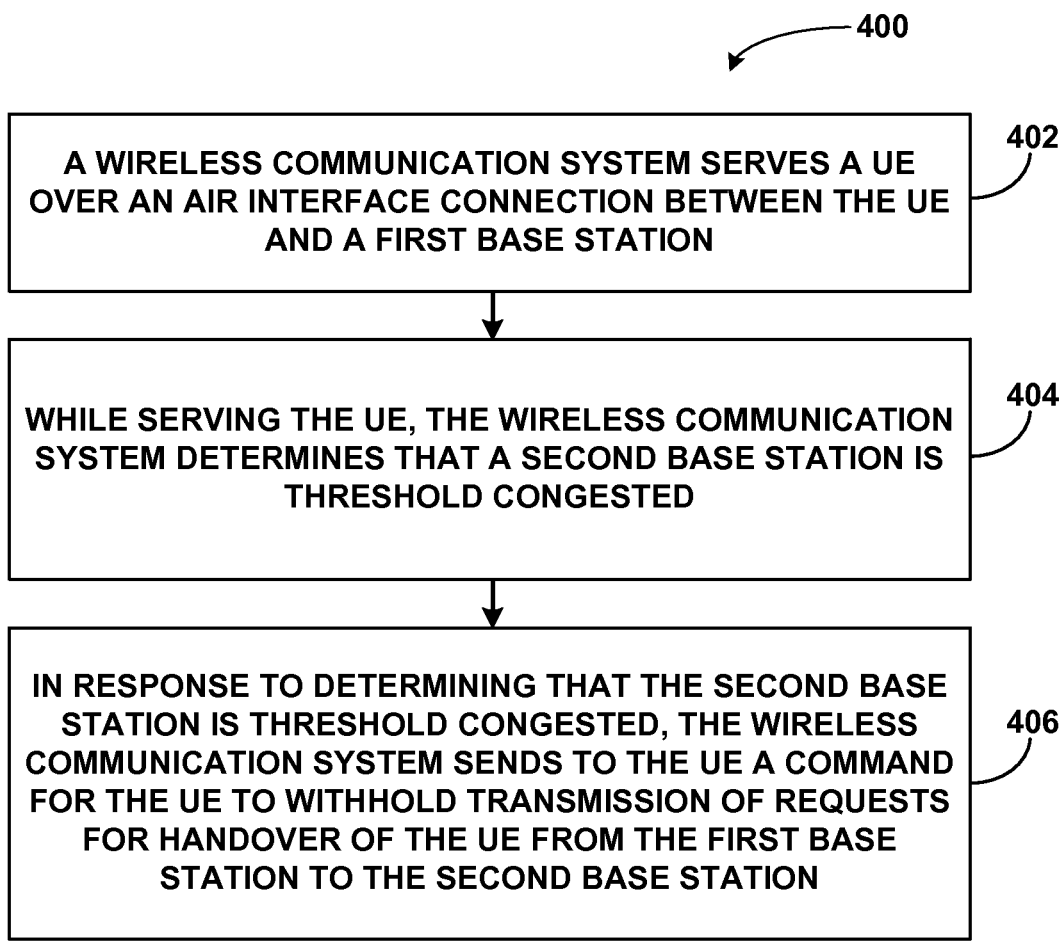
FIG. 4 is a flowchart illustrating another method for directing a UE to forgo requesting handover to a congested neighbor, in accordance with an example embodiment.

FIG. 4 is next a flow chart depicting another example set of operations that can be carried out by a wireless communication system in an implementation of this process. In accordance with the disclosure, any of the above-discussed aspects of the disclosure could also apply to this example set of operations.

In particular, this process is operable in a wireless communication system including a first base station and a second base station. As shown in FIG. 4, at block 402, the wireless communication system serves a UE over an air interface connection between the UE and the first base station. At block 404, while serving the UE, the wireless communication system determines that the second base station is threshold congested. Then at block 406, in response to determining that the second base station is threshold congested, the wireless communication system sends to the UE a command for the UE to withhold transmission of requests for handover of the UE from the first base station to the second base station.

In an example implementation, the eNodeB 12A could determine that the eNodeB 12B is threshold congested without the eNodeB 12A first receiving from the UE 14 the handover request requesting handover of the UE 14 from eNodeB 12A to eNodeB 12B. In this case, responsive to determining that the eNodeB 12B is threshold congested, the eNodeB 12A may transmit to the UE 14 a command for the UE 14 to withhold transmission of requests for handover of the UE 14 from eNodeB 12A to eNodeB 12B. In this manner, the eNodeB 12A preemptively ensures that it does not receive from the UE 14 handover requests that the eNodeB 12A would otherwise deny.

Exemplary embodiments have been described above. Those skilled in the art will understand, however, that changes and modifications may be made to these embodiments without departing from the true scope and spirit of the invention.

We claim:

1. A method operable in a wireless communication system including a first base station and a second base station, the method comprising:

serving, by the wireless communication system, a user equipment device (UE) over an air interface connection between the UE and the first base station;

while serving the UE, the wireless communication system receiving from the UE a handover request requesting a handover of the UE from the first base station to the second base station; and in response to receiving from the UE the handover request, the wireless communication system determining that the second base station has encountered a threshold high extent of congestion-based handovers away from the second base station, and, responsive to determining that the second base station has encountered the threshold high extent of congestion-based handovers away from the second base station, (i) denying the handover request and (ii) sending to the UE a command for the UE to withhold transmission of further requests for handover of the UE from the first base station to the second base station, wherein determining that the second base station has encountered the threshold high extent of congestion-based handovers away from the second base station comprises (a) receiving from the second base station one or more cause codes each indicating a cause of a respective handover from the second base station to a base station other than the second base station, (b) determining a count of particular cause codes, from among the one or more received cause codes, that indicate the cause of the respective handover as being congestion of the second base station, and (c) determining that the count exceeds a threshold count.

2. The method of claim 1, further comprising:
the wireless communication system determining that the second base station has encountered, after the wireless communication system sent the command, a threshold low extent of congestion-based handovers away from the second base station, and, responsive to determining that the second base station has encountered, after the wireless communication system sent the command, the threshold low extent of congestion-based handovers away from the second base station, the wireless communication system sending to the UE a further command for the UE to no longer withhold transmission of further requests for handover of the UE from the first base station to the second base station.

3. The method of claim 1, wherein determining that the second base station has encountered a threshold high extent of congestion-based handovers away from the second base station comprises determining that the second base station has encountered a threshold high extent of handovers due to backhaul congestion.

4. A method operable in a wireless communication system including a first base station and a second base station, the method comprising:
serving, by the wireless communication system, a user equipment device (UE) over an air interface connection between the UE and the first base station;
while serving the UE, the wireless communication system determining that the second base station has encountered a threshold high extent of congestion-based handovers away from the second base station, wherein determining that the second base station has encountered the threshold high extent of congestion-based handovers away from the second base station comprises (i) receiving from the second base station one or more cause codes each indicating a cause of a respective handover from the second base station to a base station other than the second base station, (ii) determining a count of particular cause codes, from among the one or more received cause codes, that indicate the cause of the respective handover as being congestion of the second base station, and (iii) determining that the count exceeds a threshold count; and
in response to determining that the second base station has encountered the threshold high extent of congestion-based handovers away from the second base station, the wireless communication system sending to the UE a command for the UE to withhold transmission of requests for handover of the UE from the first base station to the second base station.

5. The method of claim 4, wherein the command is also for (a) the UE to detect one or more of: (i) a transition of the UE from operating in an active mode to operating in an idle mode and (ii) handover of the UE from the first base station to a base station other than the second base station, and, (b) responsive to the UE detecting one or more of: (i) a transition of the UE from operating in an active mode to operating in an idle mode and (ii) handover of the UE from the first base station to a base station other than the second base station, the UE to no longer withhold transmission of requests for handover of the UE to the second base station.

6. The method of claim 4, further comprising:
further in response to determining that the second base station has encountered the threshold high extent of congestion-based handovers away from the second base station, the wireless communication system configuring itself to deny requests for handover of the UE from the first base station to the second base station.

7. The method of claim 6, further comprising:
after sending the command, the wireless communication system detecting one or more of: (i) a transition of the UE from operating in an active mode to operating in an idle mode and (ii) handover of the UE from the first base station to a base station other than the second base station; and
in response to the detecting one or more of: (i) a transition of the UE from operating in an active mode to operating in an idle mode and (ii) handover of the UE from the first base station to a base station other than the second base station, the wireless communication system reconfiguring itself to no longer deny requests for handover of the UE from the first base station to the second base station.

8. The method of claim 6, further comprising:
the wireless communication system determining that the second base station has encountered, after the wireless communication system sent the command, a threshold low extent of congestion-based handovers away from the second base station and, in response to determining that the second base station has encountered, after the wireless communication system sent the command, the threshold low extent of congestion-based handovers away from the second base station, the wireless communication system (i) sending to the UE a further command for the UE to no longer withhold transmission of requests for handover of the UE from the first base station to the second base station and (ii) reconfiguring itself to no longer deny requests for handover of the UE from the first base station to the second base station.

9. The method of claim 4, wherein determining that the second base station has encountered a threshold high extent of congestion-based handovers away from the second base station comprises determining that the second base station has encountered a threshold high extent of handovers due to backhaul congestion.

10. A wireless communication system comprising:
a first base station;
a second base station; and
a controller configured to perform operations comprising:
causing the first base station to serve a user equipment device (UE) over an air interface connection between the UE and the first base station;

while the first base station serves the UE, receiving from the UE a handover request requesting a handover of the UE from the first base station to the second base station; and in response to receiving from the UE the handover request, determining that the second base station is has encountered a threshold high extent of congestion-based handovers away from the second base station, and, responsive to determining has encountered the threshold high extent of congestion-based handovers away from the second base station, (i) denying the handover request and (ii) sending to the UE a command for the UE to withhold transmission of further requests for handover of the UE from the first base station to the second base station, wherein determining that the second base station has encountered the threshold high extent of congestion-based handovers away from the second base station comprises (a) receiving from the second base station one or more cause codes each indicating a cause of a respective handover from the second base station to a base station other than the second base station, (b) determining a count of particular cause codes, from among the one or more received cause codes, that indicate the cause of the respective handover as being congestion of the second base station, and (c) determining that the count exceeds a threshold count.

11. The wireless communication system of claim 10, wherein the first base station comprises a macro base station, and wherein the second base station comprises a small cell.

12. The wireless communication system of claim 10, wherein the controller is part of the first base station and causes the first base station to perform the operations.

13. The wireless communication system of claim 10, wherein determining that the second base station has encountered a threshold high extent of congestion-based handovers away from the second base station comprises determining that the second base station has encountered a threshold high extent of handovers due to backhaul congestion.

* * * * *